Figure 6:
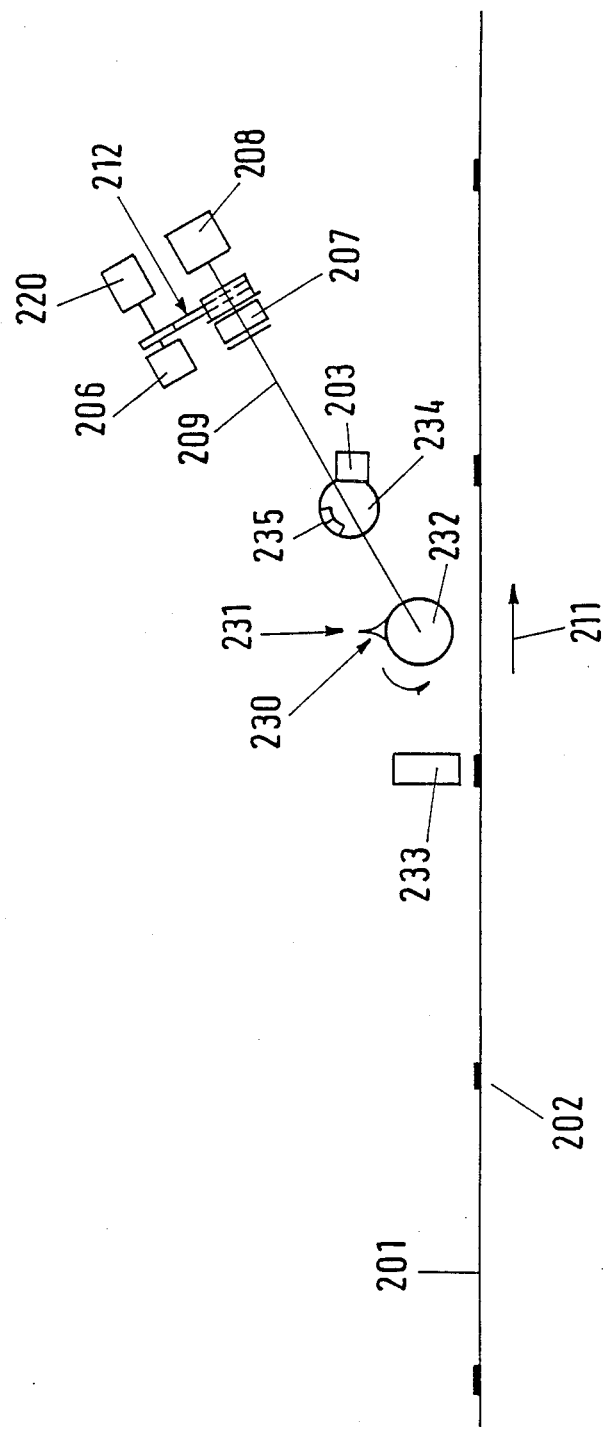

United States Patent [19]

Blohm et al.

[11] Patent Number: 4,987,546
[45] Date of Patent: Jan. 22, 1991

[54] METHOD AND CIRCUIT FOR CONTROLLING THE SPEED OF AN OBJECT MOVEABLE BY A DRIVE

[75] Inventors: Knud Blohm; Steen Hornsleth, both of Nordborg, Denmark

[73] Assignee: Danfoss A/S, Nordborg, Denmark

[21] Appl. No.: 374,139

[22] Filed: Jun. 30, 1989

[30] Foreign Application Priority Data

Jul. 9, 1988 [DE] Fed. Rep. of Germany ....... 3823304

[51] Int. Cl.⁵ ............................................. G05B 19/28
[52] U.S. Cl. ............................. 364/474.3; 364/474.12; 318/603
[58] Field of Search ........... 364/474.3, 474.28, 474.34, 364/474.35, 474.12, 167.01, 174; 318/600, 603, 601; 209/555

[56] References Cited

U.S. PATENT DOCUMENTS

| | | | |
|---|---|---|---|
| 4,081,732 | 3/1978 | Aoyama | 318/603 |
| 4,312,033 | 1/1982 | Sweeney et al. | 364/474.12 |
| 4,398,138 | 8/1983 | Kohzai et al. | 318/603 |
| 4,586,123 | 4/1986 | Plassmeir | 364/474.3 |

*Primary Examiner*—Jerry Smith
*Assistant Examiner*—Paul Gordon
*Attorney, Agent, or Firm*—Wayne B. Easton

[57] ABSTRACT

A method for controlling the speed of an object which is moveable by a drive and is intended to have reached a predetermined speed after the occurrence of a release signal at a predetermined location. Also a circuit for performing this method including a permanently running drive, an object to be driven, releasable clutch-brake unit between the drive and object and a position sensor. The clutch-brake unit is being brought into clutch or brake engagement depending on a release signal from the position sensor.

4 Claims, 6 Drawing Sheets

FIG.1
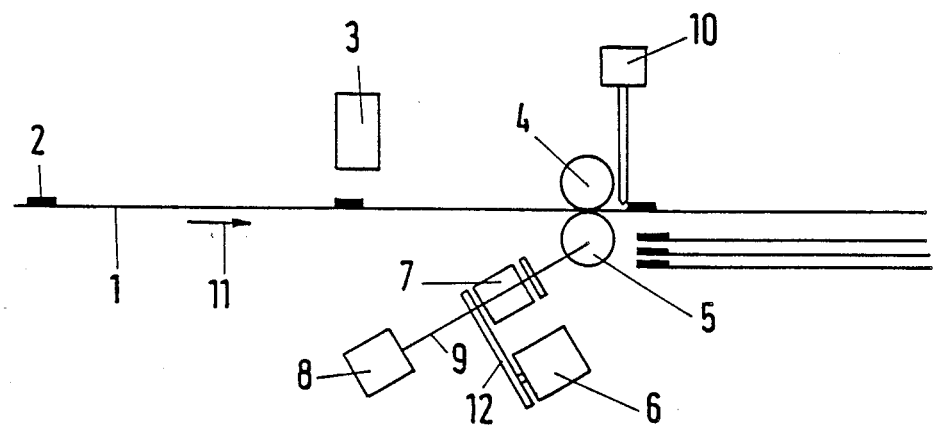
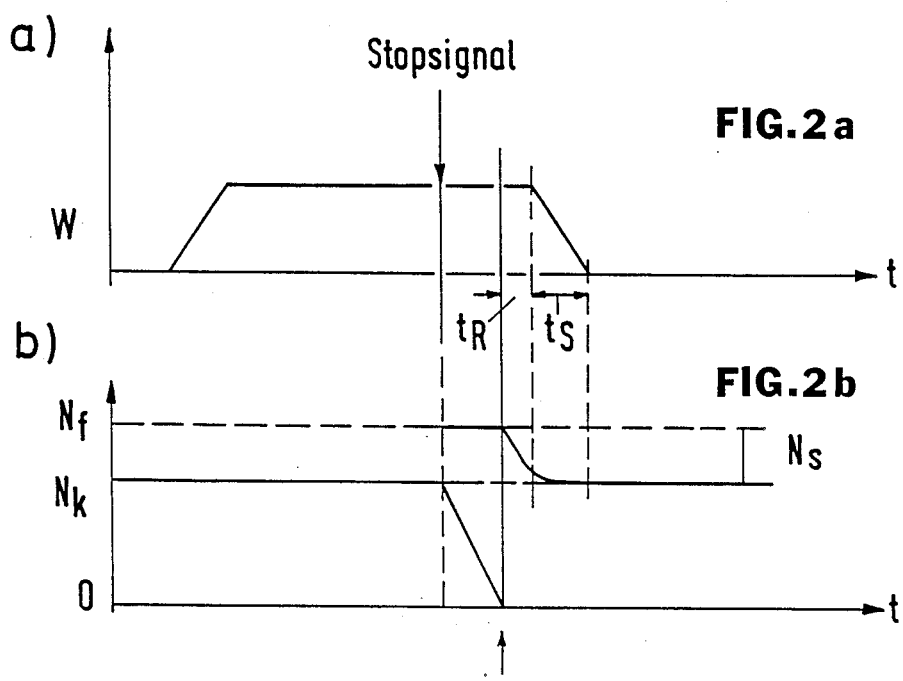
a) FIG.2a
b) FIG.2b

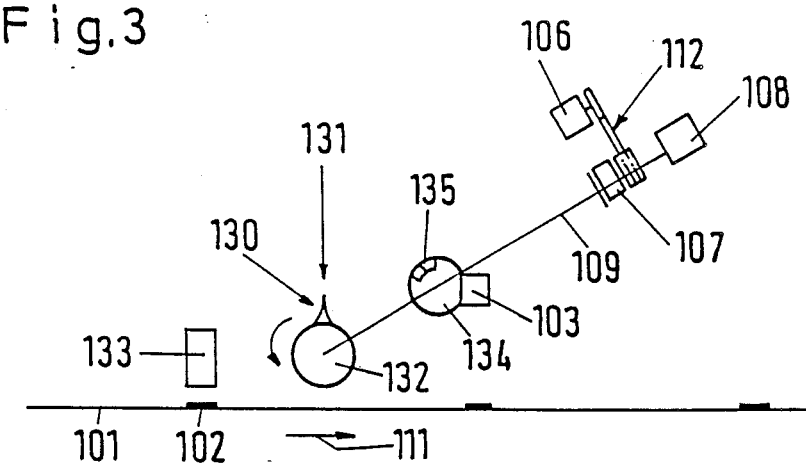
Fig.3
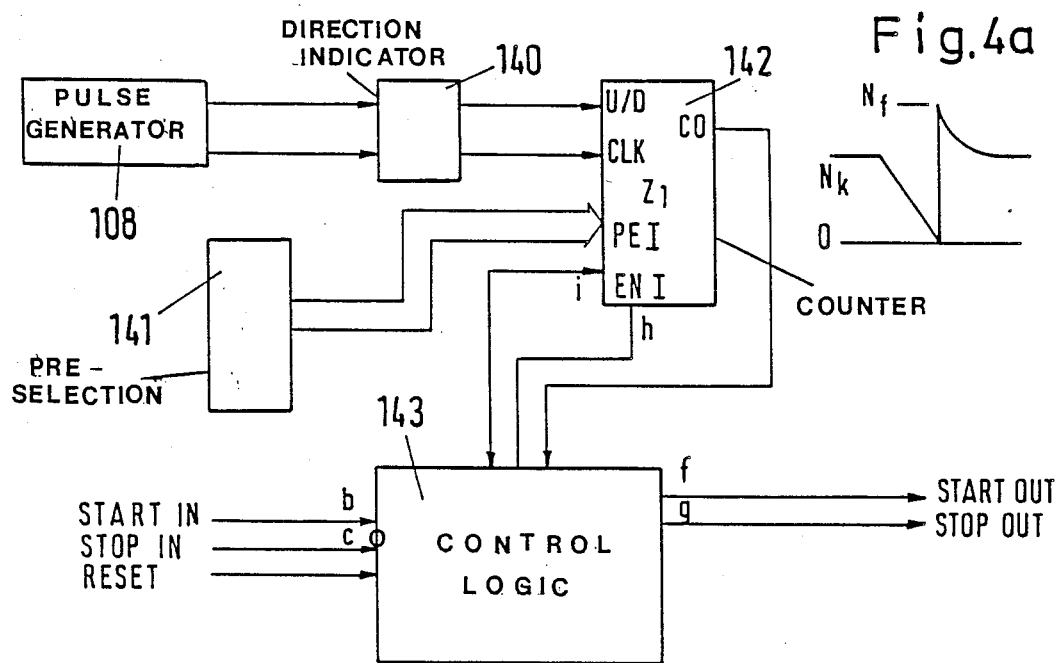
Fig.4
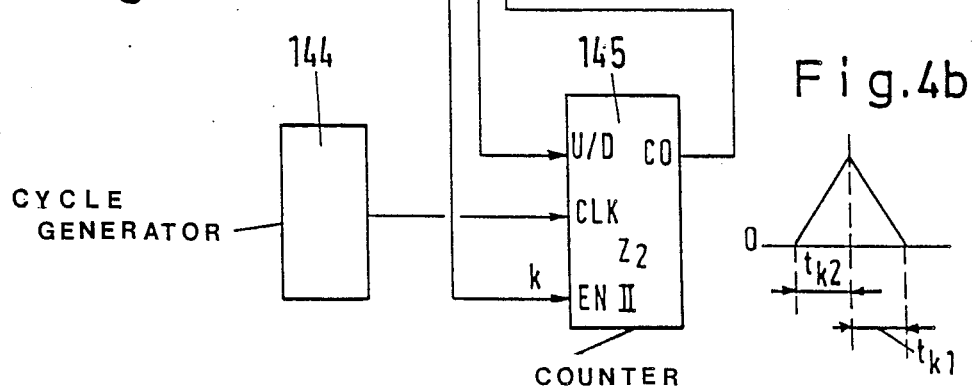
Fig.4a
Fig.4b

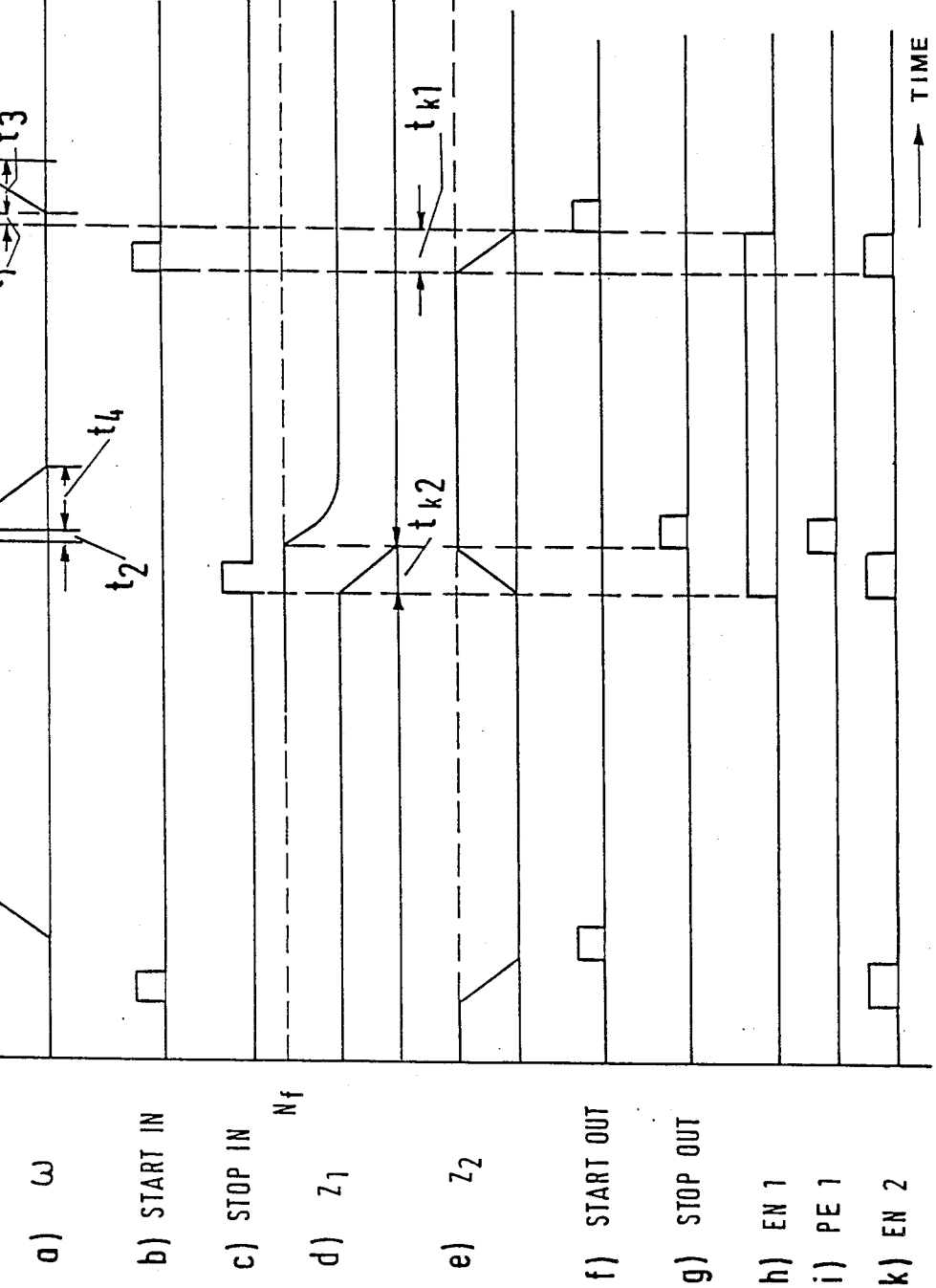

METHOD AND CIRCUIT FOR CONTROLLING THE SPEED OF AN OBJECT MOVEABLE BY A DRIVE

The invention relates to a method for controlling the speed of an object which is movable by a drive and is intended to have reached a predetermined speed after the occurrence of a release signal at a predetermined location, and to a circuit for performing this method, comprising a permanently running drive, an object to be driven, releasable clutch-brake means between the drive and object and a position sensor, the clutch-brake means being brought into clutch or brake engagement depending on a release signal from the position sensor.

Such a method and apparatus are known from the Danfoss Brochure CK.54.A3. 02 dated June 1982. In the case of clutch-brake means disclosed therein, the input shaft is connected to a motor that normally runs at a constant speed. An object to be driven is connected to its output shaft. This object is generally a tool which is to be actuated intermittently or a length of material that is to be transported intermittently. For this purpose, the clutch-brake means are first of all brought into coupling engagement, whereby the object is accelerated until it has a speed proportional to the rotary speed of the motor, and is later brought into braking engagement, whereby it is braked with substantially the same characteristic as during acceleration, generally up to standstill. The coupling or braking engagement is initiated by sensors which monitor the position of the object or that of another moved article with which the object is to cooperate. By means of a control signal from a sensor, one actuates, say, a magnetic valve which allows pressure or vacuum into the clutch-brake means to bring them into coupling or braking engagement. After delivery of the control signal, e.g. a stop signal, a fixed reaction period passes and this is necessary so that all the electrical and mechanical elements, e.g. switches, can assume their predetermined starting condition and, in the case of pneumatic operation, the required pressure can be built up in the conduits. During this time (reaction period), the driven object still travels a certain distance or continues to be driven through a certain angle (reaction angle). Upon expiry of the reaction period, that is to say when the clutch-brake means have actually been brought into braking engagement, the object continues to turn through a certain angle (advancing angle) until it comes to a standstill. The sum of the reaction angle and advancing angle is constant if one assumes a constant speed and load. Thus, if the object is to be stopped at a particular point, the stop signal has to be released a certain period earlier during which the object travels through the reaction angle and the advancing angle. With constant operating conditions, this period can be easily determined and the instant of the stop signal can be fixed. However, if the speed and/or load varies, the stop position that is reached necessarily also changes.

It is the problem of the invention to provide a method and circuit with which a speed change can be so carried out in the case of a variable speed difference and/or load that an object will have reached a predetermined speed and a predetermined location.

This problem is solved in a method of the aforementioned kind in that a speed-dependent compensating period is provided between the occurrence of the release signal and introducing the change in speed.

The introduction of the speed change is the commencement of the aforementioned reaction period, i.e. the instant when the release signal used to be given. According to the invention, therefore, the release signal, e.g. the stop signal or the start signal, is given earlier than hitherto to give sufficient time for the compensating period to pass. The compensating period is a variable quantity which can be adapted to the different speed and load conditions of the object. This makes it possible to control the object, always with the same stop or start signal, so that it will have reached a predetermined speed at a predetermined location despite different speeds and/or loads.

It is of particular advantage for the compensating period to depend on the difference in the two speeds before and after a speed change and to decrease with an increase in the speed difference. The higher the speed difference, the more time is required for braking the object from the higher to the lower speed, or, conversely, for accelerating it. In addition, the reaction angle travelled during the constant reaction period increases. One can compensate for this in that the compensating period is shortened appropriately. Conversely, the compensating period can be increased if the object has to be braked or accelerated only slightly.

It is a particular advantage in the case of repetitive speed changes with speed differences of the same size to detect the necessary compensating period for a preceding speed change. This ensures automatic setting of the compensating period in successive speed change cycles. If the speed difference and/or load of the object changes, it is possible that the directly following speed change does not occur as desired, i.e. the object is braked or accelerated too soon or too late. However, for this speed change the compensating period is newly set so that the further speed changes can be carried out in such a way that the object reaches a predetermined speed at a predetermined location.

In a preferred embodiment, a first counter is counted down starting with the release signal from a speed-dependent first value depending on the movement of the object and, on reaching a predetermined second value, the speed change is introduced. The terms "counting down" or "counting up" are not limited to the reduction or increase in the condition of the counter. These terms are intended to convey that there are two directions of counting which are oppositely directed. In this sense, "counting down" may mean a reduction as well as an increase in the counter condition, whilst "counting up" correspondingly means increasing or reducing. "Movement-dependent counting" means the counting of pulses produced as a result of movement of the object and being a measure of the path travelled or the angle turned. "Time-dependent counting" is, on the other hand, the counting of pulses which are produced at a constant time spacing by a cycle generator and are a measure of the time passed. The movement-dependent counting of pulses permits a simple definition of the distance covered. Also, counted values are easily processed. By counting down a speed-dependent value with movement-dependent pulses, a dual effect is achieved. With high speeds, the difference between the speed-dependent first value and the predetermined second value is low. Since the pulses are given off correspondingly more rapidly for a high speed of the object, the compensating period is reduced by the cooperation of these two features.

Preferably, when introducing the speed change, the first counter is set to a third predetermined value and counted down from there depending on the movement of the object until the object has reached the predetermined location. The difference between the predetermined third value and the predetermined second value is a measure of the distance which the object has to travel between occurrence of the release signal and the predetermined position. By means of this step in the method, it is possible to detect accurately the distance which the object travels in the reaction period and the advancing angle period. The remaining time is then the compensating period. By reason of the fact that the reduced third value can be stored and employed during the next cycle as a speed-dependent first value, it is possible to achieve self-correction of control in a simple manner when a speed difference and/or load change of the object has occurred.

For certain operating conditions, it is not only desirable to control braking so that the object has a predetermined speed, especially zero speed, at a predetermined location particularly in the case where an object is to be intermittently driven so that, after a certain starting period, it has a certain speed which, for example, is synchronous with the speed of another object, it is necessary to compensate the differences in the position of the object as caused by different terminal speeds when the terminal speed is reached. It is in this case difficult to obtain a corresponding compensating period for the start because no movement-dependent pulses are available for a stationary object. In systems having only little friction, however, the compensating period determined during braking can also be used for starting. It is then advantageous that, on a reduction in the speed of the object, a second counter is counted up from a predetermined first value to a second value until the first counter has reached its predetermined second value, that, on the occurrence of a signal increasing the speed, the second counter is counted down from its second value until the first predetermined value of the second counter has been reached, and that, on reaching this value, the increase in speed is initiated.

Preferably, the first counter counts proportionally to the movement of the object and the second counter proportionally to the movement of the drive. On introducing the speed change, the second counter is set to a predetermined third value, the first counter is counted down from a predetermined first value to a predetermined second value dependant on movement, and the second counter Is counted down from its first value until the first counter has reached its second value. This enables one to achieve a starting time compensation even if the system has friction which assists braking but opposes acceleration.

A speed control circuit of the aforementioned kind is developed in accordance with the invention in that, on the occurrence of the release signal, the position sensor transmits to the clutch-brake means a control signal which is retarded by a delay element by a period depending on the speed of the drive. Thus, the clutch-brake means are not actuated immediately on the occurrence of the release signal as was the case hitherto but only after a certain compensating period which can be set in dependence on the speed.

In a preferred embodiment, the position sensor detects the position of the object. Depending on the instantaneous position of the object, the movement of the object can be controlled so that the object has reached a predetermined speed at a predetermined location.

In a further preferred embodiment, the object to be driven is a machining tool for a workpiece and the position sensor detects the position of the workpiece. For many applications, it is necessary to accelerate and brake a tool depending on the speed of the workpiece. It is then important, when the tool meets the workpiece, for example during cutting, printing or stamping a film, the tool should have a predetermined speed, e.g. the speed of the film. The position sensor detects a marking on the film, the delay element retards the signal to the clutch-brake means by a variable amount so that, despite different speeds of the film, the tool will always have the same speed as the workpiece when it makes contact with the workpiece.

It is preferred that the drive should drive the workpiece permanently and that it should drive the tool intermittently by way of the clutch-brake means. This gives a direct relationship between the workpiece speed and the speed of the tool when meeting the workpiece. Acceleration and braking of the tool can be controlled by way of the circuit according to the invention.

In a preferred embodiment, the delay element comprises a first counter connected to a pulse generator connected to the object. The counter counts pulses which are a direct measure for the distance or angle travelled by the object. The circuit therefore contains a parameter about what distance has already been travelled after occurrence of the release signal or rather what distance is still available up to the desired position.

In a preferred embodiment, for controlling braking of the object towards a release signal of the position sensor, the counter counts down from a first value to a predetermined second value, disengages the clutch and brakes the object on reaching this second value, and assumes a predetermined third value corresponding to the distance between the position of the object on production of the release signal and the predetermined position of the object. From this third value, the first counter counts down until the object has reached the predetermined position, the first counter storing the reduced third value as a speed-dependent first value for the next cycle. In this way, the circuit provides a simple solution for the problem of how in the case of variable speed differences the variable compensating period can be adapted to particular conditions. The predetermined third value of the first counter corresponds to the number of pulses sent by the object by way of the pulse generator between the occurrence of the release signal and reaching the predetermined position. This distance is now divided into a distance or angle traversed by the object from the start of braking, i.e. from delivery of a control signal to the clutch-brake means up to standstill (reaction and advance angle) and a distance or angle traversed by the object during the compensating period. Since the reaction angle and advance angle travelled during the reaction period and the advance angle period are determined by the actual speed, one is left with a compensating period (expressed in the number of pulses) which is the difference between the predetermined third value and the reduced third value after reaching the predetermined position.

In a further preferred embodiment, a time measuring element is provided which measures the speed-dependent time during braking of the object and serves as a delay element which retards commencement of acceleration of the object by the same time increment. For many applications, it is necessary to accelerate the object, for example a tool, depending on the speed of a third article, for example a workpiece. Depending on which terminal speed the object is to have reached, it is necessary to select the accelerating phase to have different lengths. During a longer starting phase, the compensating period must be shortened correspondingly. Since no movement-dependent pulses are available for an object which is at rest, in a system having little friction, the compensating period used for braking the object is preferably employed as compensating period during acceleration of the object if acceleration and braking occur during roughly the same time increment.

Advantageously, provision is made for a second counter which, with a stop signal from the position sensor, counts depending on time from a first predetermined value up to a second value until the delay element disengages the clutch and brakes the object and, with a start signal from the position sensor, counts depending on time from the second value up to the first value before the clutch engages and accelerates the object. In this way, one ensures that the stop compensating period, i.e. the compensating period during braking of the object, very accurately corresponds to the start compensating period, i.e. the compensating period during acceleration of the object.

In another preferred embodiment, a first pulse generator connected to the object is connected to the first counter and a second pulse generator connected to the drive is connected to the second counter. The second counter counts down from the value depending on the speed of the object to a predetermined second value, engages the clutch upon reaching the predetermined second value, releases the brake, assumes the predetermined third value and counts down from this value until the first counter has counted down from a predetermined first value to a predetermined second value, the difference between the first and second values of the second counter being proportional to the distance covered by the object. In this embodiment, it is possible to provide a start compensating period for a system which has friction. During braking of the object, the friction supports braking. However, during acceleration, it acts opposite to the direction of acceleration so that a longer period is necessary for the accelerating phase than for the braking phase. In the preferred embodiment, one no longer uses the stop compensating period to form the start compensating period. Instead, one measures the distance to be covered by the object to reach the predetermined speed. One also knows the distance that the object has to cover between occurrence of the release signal and reaching its predetermined position. The difference between these two distances is a measure of the compensating period available at this speed.

Preferably, each pulse generator is connected to the associated counter by a direction discriminator. This makes it possible to undertake the previously described evaluations despite different directions of rotation.

In a further preferred embodiment, each counter is connected to an adjustable fixed value generator. A change in the operating condition, i.e. the use of a different object to be accelerated or a larger or smaller workpiece with different markings, only requires a change in the setting of the fixed value generator.

Preferably, the counters, clutch-brake means and the position sensor are connected to a control circuit which coordinates the operation. This enables one to simplify the function of the stated elements because they do not have to fulfil any functions other than counting, coupling and braking and the omission of a signal. These other functions are assumed by the control circuit. This enables a modular construction for the circuit, which considerably simplifies design, maintenance and repair.

Figure 7:
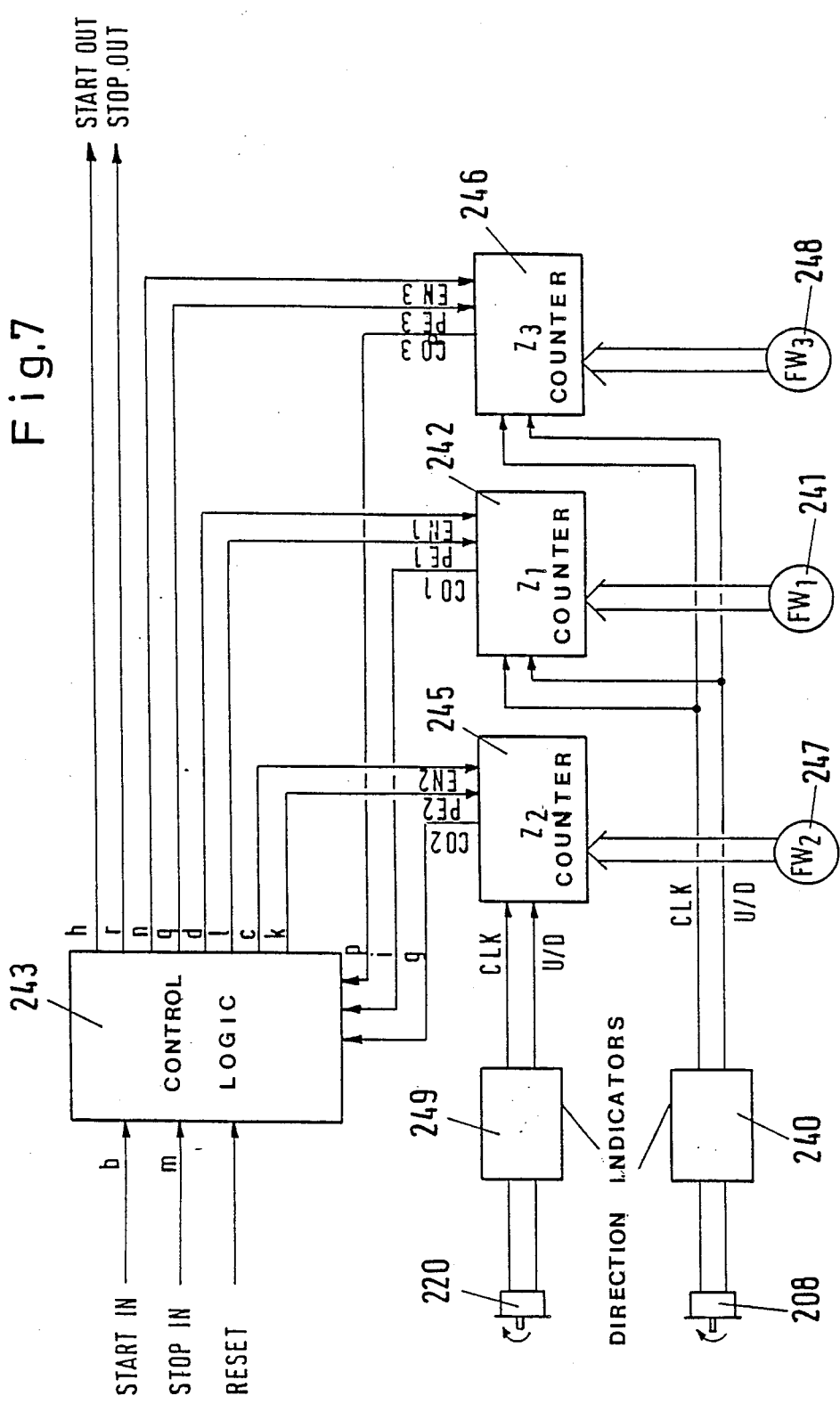
Figure 8:
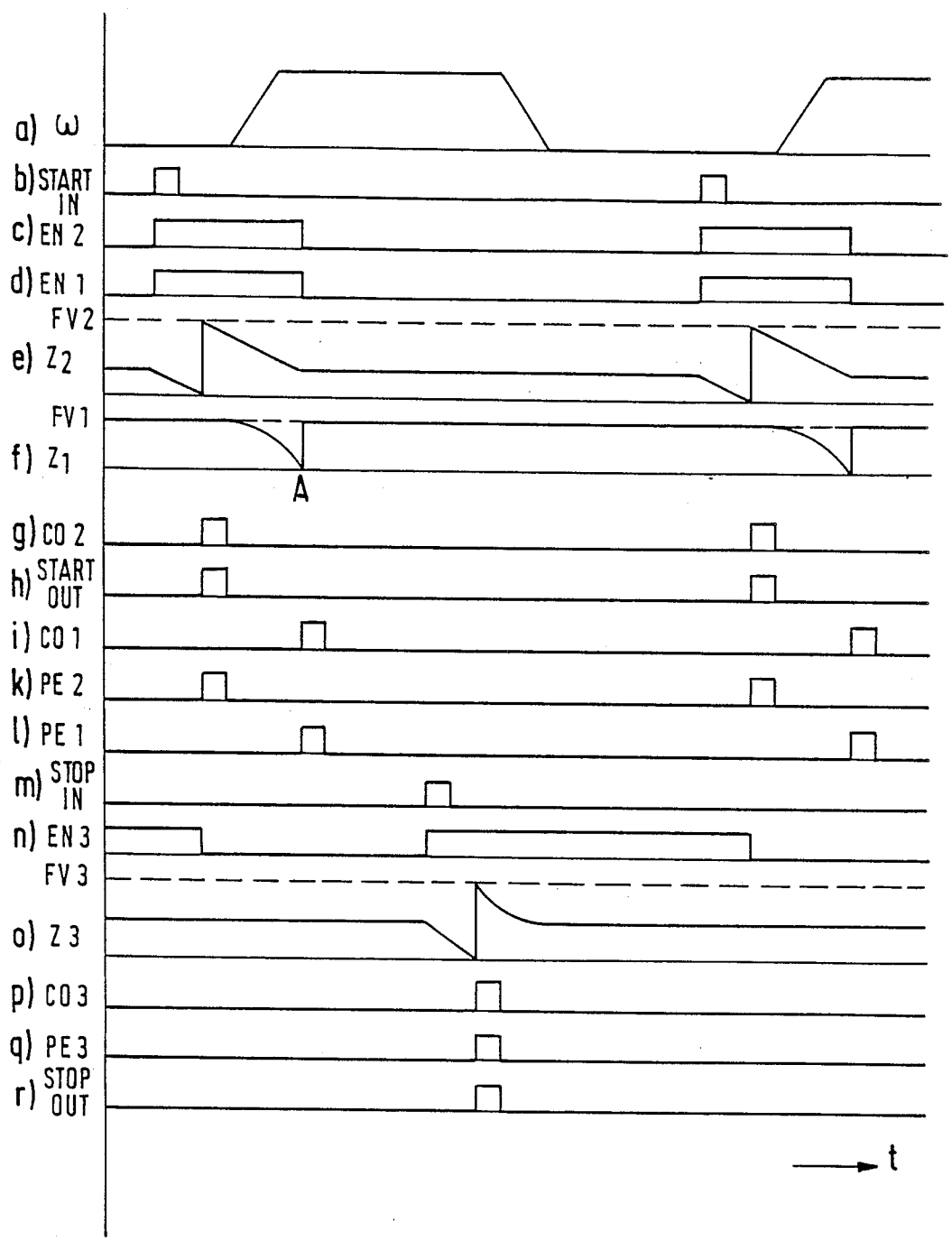

Preferred examples of the invention will now be described in more detail with reference to the drawing, wherein:

FIG. 1 shows film stamping equipment to explain the compensating period during braking of an object, FIG. 2 illustrates the associated function, FIG. 3 shows a film cutting apparatus to explain the compensating period during starting and braking of an object in a system which is practically free from friction, FIG. 4 is a circuit arrangement for controlling the FIG. 3 equipment, FIGS. 4a+b relate counter and time periods, respectively, FIG. 5 shows the function of a few parameters of the FIG. 4 circuit arrangement, FIG. 6 shows a film cutting apparatus to explain the compensation during braking of an object in a system having friction, FIG. 7 is a circuit arrangement for controlling the equipment of FIG. 6, and FIG. 8 shows the function of a few parameters of the FIG. 7 circuit.

FIG. 1 illustrates film stamping equipment in which a film 1 moved by draw rollers 4, 5 in the direction of the arrow 11 is to be stopped so that a stamping tool 10 can stamp the film directly behind markings 2. The draw roller 5 is driven by a motor 6 by way of a V-belt or toothed belts 12 and clutch-brake means. On the output shaft 9 of the clutch-brake means, a pulse generator 8 is arranged adjacent to the draw roller 5 and it transmits a certain number of pulses when passing through a certain angle of rotation. The clutch-brake means 7 are known and are, for example, offered by the applicants under the designation SRA in Brochure CK.54.A3.02. The clutch-brake means 7 either establish a connection between the imput shaft driven by the motor and the output shaft 9 driving the draw roller when they receive a corresponding signal, or they undo the connection between the input shaft and the output shaft 9 and brake the output shaft with practically the same characteristics as it was accelerated during coupling. The film 1 is thereby intermittently driven. A sensor 3 detects the markings 2 on the film 1 as they move past it.

During operation, the clutch-brake means 7 engage on the occurrence of a corresponding signal and connect the motor 6 to the draw roller 5. The draw rollers 4, 5 and consequently the web of film 1 are accelerated until a predetermined speed has been reached. From this speed, the film has to be braked again. Upon standstill, it is to have assumed the FIG. 1 position so that the marking is disposed directly behind the stamping tool. A corresponding course of the speed W against the time t is illustrated in FIG. 2a.

In order that the web of film 1 can be braked in time by way of the draw roller 5 and the clutch-brake means, the sensor 3 when detecting a marking 2 emits a stop signal as shown in FIG. 2a. This stop signal ensures that a counter is counted down from a first value $N_k$ depending on pulses from the impulse generator 8. The value $N_k$ depends on the speed of the draw roller 5. On reaching the value zero, the counter transmits a signal to the clutch-brake means 7 for initiating braking. A reaction period $t_R$ elapses until braking actually commences and an advance angle period $t_S$ elapses until the draw roller 5 has reached a standstill. On reaching the counter state zero, the counter is set to a value $N_f$ from there counted down depending on pulses from the pulse generator 8 until the draw roller 5 has reached a standstill. During this time, the pulse generator 8 has transmitted a number of pulses equal to $N_s$.

The value $N_s$ is a measure of the distance travelled by the draw roller 5 between occurrence of the stop signal and standstill. The difference between the two values $N_f$ and $N_s$, namely the value $N_k$, is a measure of the compensating period. Since $N_s$ depends on the speed, $N_k$ likewise depends on the speed and can be employed for the next stop cycle which generally takes place under the same conditions.

When the draw roller 5 turns at a higher speed, there is an increase first in the angle of rotation which it covers during the reaction period and second in the advance angle. Thus, at a higher speed, the pulse generator 8 transmits a higher number $N_s$ of pulses. The value $N_k$ is reduced correspondingly. Accordingly, at a higher speed there is only a correspondingly smaller compensating period available. The maximum speed, i.e. the speed at which one can still ensure that the film will come to rest at the desired location, is determined by the value $N_s$. The number of pulses $N_s$ transmitted after initiation of braking may be no larger than the number of pulses corresponding to the distance covered between the stop sensor 3 and the stamping tool 10. In this case, the value $N_k$ is zero. On the other hand, if the draw roller 5 turns at a lower speed, the distance required for stopping is correspondingly shorter and the value $N_s$ is reduced. The compensating period is increased accordingly and the value $N_k$ increases.

After a change in the terminal speed of the draw roller 5, it is possible that the next following stamping operation will not take place at the proper location. However, no later than the next but one stamping operation, the compensating period has been appropriately set by the value $N_k$ so that all further stamping operations will again take place in the correct position of the film.

FIG. 3 illustrates film cutting equipment in which all the parts of FIG. 1 are provided with reference numerals increased by 100. The system is to operate with little friction.

A film 101 is moved in the direction of the arrow 111. A rotating knife 130 carried by a knife shaft 132 is in a stop position 131 when at rest. The knife shaft 132 is driven by a motor 106 by way of a toothed belt 112 and clutch-brake means 107. On the output shaft of the clutch-brake means 107 there is a pulse generator 108, a marking carrier 134 and the knife roller 132. The pulse generator 108 transmits a certain number of pulses when the knife shaft 132 passes through a certain angle of rotation. The marking carrier 134 has a marking 135 which is detected by a stop sensor 103. The film 101 has markings 102 detected by a start sensor 133.

The film 101 is moved at a constant speed in the direction of the arrow 111. It may be permanently driven by the motor 106. The knife 130 is to cut the film 101 at predetermined locations. The predetermined locations are a certain distance behind the markings 102. For cutting purposes, the knife 130 must have the same speed as the film 101. For this purpose, it is necessary to accelerate the knife so that it will have the same speed at the predetermined cutting position as does the film 101. On the other hand, the knife 130 is to remain in the stop position 131 when at rest.

FIG. 4 shows a circuit with which the speed control of the knife shaft 132 can be carried out. The pulse generator 108 is connected by way of a direction discriminator 140 to a first counter (Z1) 142. The first counter 142 is connected to a preselection generator and to a control logic 143. The control logic is connected to a second counter (Z2) 145 which, in turn, receives cycle pulses from a cycle generator 144

The control of braking the knife shaft 132 takes place in the manner described in connection with braking of the draw roller 4 in FIG. 1. When the marking 135 passes the stop sensor 103, the stop sensor 103 produces a signal STOP IN (FIG. 5c) which it transmits to the control logic. The control logic 143 produces a signal EN1 (FIG. 5h) which causes the counter 142 to count down from a first value (FIG. 5d). The counting pulses used are the pulses of the pulse generator 108 which are transmitted by way of the direction discriminator 140 to the input c1k of the counter 142. The input U/D of the counter 142 receives information about the direction of rotation of shaft 109. Upon reaching the value zero, the counter 142 sends a signal CO to the control logic 143. The control logic 143 thereupon produces two signals PE1 (FIG. 5i) and STOP OUT (FIG. 5g). The signal PE1 is transmitted to the counter 142 and ensures that the counter is set to a value $N_f$ which is preset by the preselection generator 141. The signal STOP OUT is transmitted to the clutch-brake means 107 and ensures that the braking process is initiated. Up to actual standstill of the knife shaft 132, one still has the reaction period $t_2$ and the advance angle period $t_4$ (FIG. 5a). During this time, the counter 142 is counted down from the value $N_f$ depending on the pulses of the pulse generator 108 until the knife shaft 132 has come to a standstill (FIG. 5d).

On occurrence of the signal STOP IN (FIG. 5c) the control logic produces a signal ENII (FIG. 5k) which is transmitted to the counter 145. This signal EN2 permits the second counter 145 to count until the first counter 142 has reached the value zero (FIG. 5d). During this time, which corresponds to the compensating period $t_{k2}$, the counter 145 counts from a first value, for example zero, to a second value. The longer the compensating period, the longer does the counter 145 count up and the larger is the value reached (FIG. 5e).

To accelerate the knife shaft out of its stop position so that, upon touching the film 101 at the desired location, it has the same speed as the film 101, one must also provide a start compensating period. When a marking 102 of the film 101 passes the start sensor 133, this start sensor produces a signal START IN (FIG. 5b) which it transmits to the control logic 143. The control logic 143 thereupon produces a signal EN2 (FIG. 5k). The counter 145 is now counted down by the same pulses of the cycle generator 144 from the value it had reached during braking of the knife shaft until it has reached the predetermined first value. The time required for this $t_{k1}$ is equal to the compensating period $t_{k2}$ determined during braking, as is shown in detail in FIG. 4b. Upon reaching the predetermined first value, the second counter 145 transmits a signal CO to the control logic 143 which again transmits a signal START OUT (FIG. 5f) to the clutch-brake means 107. After a reaction period $t_1$, the knife roller 132 is accelerated and, after an advance angle period t₃, reaches the predetermined speed.

A prerequisite for this type of control is a system having little friction so that the friction will not assist braking or oppose acceleration. However, in a system having little friction one can, in a simple manner, employ the compensating period determined during braking in order likewise to compensate the speed-dependent differences during starting.

FIG. 6 illustrates a further example of film cutting equipment. Parts which correspond to those in FIG. 3 are provided with reference numerals increased by a further 100.

The web of film 201 is moved in the direction of the arrow 211 and is to cut at predetermined positions by the rotating knife 230 which is carried by a knife roller 232. The roller 232 is, as is shown in FIG. 4, driven by a motor 206 by way of a toothed belt 212 and clutch-brake means 207. On the output shaft of the clutch-brake means 207 there is a pulse generator 208 and a marking carrier 234 with a marking 235 which passes a stop sensor 203 The motor 206 carries a second pulse generator 220 on its output shaft.

A circuit arrangement for controlling the film cutting equipment is shown in FIG. 7. FIG. 8 illustrates the functional sequence of a few signals of FIG. 7, the conduits in FIG. 7 showing the line in which the functional sequence of the signal appearing in the conduit is shown in FIG. 8. The first pulse generator 208 is connected by way of the direction discriminator 240 to the first counter (Z1) 242 and to a third counter (Z3) 246. The first counter 242 is connected to a first preselection generator 241 and the third counter 246 is connected to a third preselection generator 248. A second pulse generator 220 which is connected to the output shaft of the motor 206 is connected to the second counter (Z2) 245 by way of a direction discriminator 249. The second counter 245 is connected to the second preselection generator 247. The three counters 242, 245 and 246 are connected to the control logic 243.

In operation, the film 201 passes below a start sensor 233 in the direction of the arrow 211. When a marking 202 passes the start sensor 233, the start sensor sends a signal START IN (FIG. 8d) to the control logic 243. The control logic 243 sends a signal EN1 (FIG. 8d) to the first counter 242 and a signal EN2 (FIG. 8c) to the second counter 245.

Both counters 242 and 245 count down until the signal EN1 or EN2 is applied to the corresponding input of the counter. The counter 242 starts counting at a speed-dependent first value. As soon as the counter 245 has reached the value zero, it sends a signal C02 (FIG. 8g) to the control logic 243. The control logic 243 thereupon sends a signal START OUT to the clutch-rake means 207 which couple the motor 206 on the output shaft 209 and, after a certain dead period, accelerate the knife roller 232. At the same time, the control logic 243 sends a signal PE2 (FIG. 8k) to the second counter 245, whereupon the latter assumes a predetermined third value which is determined by the second preselection generator 247 and can be set by the latter.

From there, the second counter 245 counts down again. Since the second counter 245 counts the pulses produced by the second pulse generator 220 connected to the output shaft of the motor 206, that is to say the pulses are constant at the asssumed constant speed of the motor, the functional sequence of the second counter is linear.

The first counter 242 which counts the pulses of the pulse generator 208 connected to the output shaft 209 of the clutch-brake means 207 begins to count as soon as the knife roller 232 turns. It counts from a value FV1 given by the first preselection generator 241 down to zero (FIG. 8f). The value given by the first preselection generator 241 is a measure of the distance between the stop position 231 of the rotating knife 230 and the location at which the knife 230 is to make contact with the film 201. This location is designated by the letter A (FIG. 8f). As soon as the first counter 242 has reached the value zero, it transmits a signal C01 (FIG. 8i) to the control logic. The control logic in turn sends a signal PE1 (FIG. 8l) to the first counter 242, whereupon this is again set to the value predetermined by the first preselection generator 241. Simultaneously, the control logic 243 sets the signals EN1 and EN2 to zero, whereby the first counter 242 and the second counter 245 stop counting. The value reached by the second counter 245 is stored and, during the next starting cycle, serves as a speed-dependent counting value from which the second counter 245 counts to zero to determine the start compensating period.

In order that the knife 230 again stops in the stop position 231, the stop sensor produces a signal STOP IN (FIG. 8m) when the marking 235 of the marking carrier 234 passes it. This signal STOP IN transmitted to the control logic 243 produces a signal EN3 (FIG. 8n) transmitted to the third counter 246. As long as this signal EN3 is applied to the third counter 246, the third counter 246 counts the pulses produced by the pulse generator 208. The third counter 246 counts down linearly from a first value determined during an earlier cycle until it reaches the value zero, whereby the compensating period is formed. As soon as it reaches the value zero, it transmits a signal C03 (FIG. 8p) to the control logic. By reason of this signal C03, the control logic 243 sends a signal STOP OUT (FIG. 8r) to the clutch-brake means 207 which sever the connection between the motor 206 and output shaft 209 and brake the knife roller 232. Simultaneously, the control logic 243 sends a signal PE3 (FIG. 8q) to the third counter 246 which is thereby set to the predetermined third value by the preselection generator 248 and counts down from this until the knife roller 232 has come to a standstill. As mentioned in connection with FIG. 1, this gives the first value of the third counter 246 from which it counts down to zero during the next cycle. Since the third counter 246 only counts when the output shaft 209 is in motion, the signal EN3 can be applied to the third counter 246 until the knife roller 232 moves again, without the danger of a wrong count. The signal EN3 is reset to zero by the signal C02 from the second counter 245.

We claim:

1. A method for controlling the starting and stopping of a moveable object in a system wherein (a) said moveable object is driven by a constantly running motor which is subject to variations in speed, (b) clutch-brake means disposed between said object and said motor is operable to join said motor and said object for said starting and to disconnect and apply braking to said object for said stopping, (c) said stopping has to be at a predetermined place and sensor means are provided for indicating with a stopsignal the position of a particular point on said object relative to said place, (d) pulse generating motion indicating means connected to and responsive to movement of said object, and (e) counting means connected to and responsive to said motion indicating means, said method comprising the following steps to effect said stopping:
- (A) programming said counting means to provide (1) a compensating stage dependent upon the speed of said object triggered by said stopsignal and (2) an operational stage for said clutch-brake means sequentially following said compensating stage and ending with the stopping of said object,
- (B) initializing said counting means at an approximate set value for the start of said operational stage,
- (C) counting down said counting means from the start to the finish of said operational stage from the current value of said set value to a lower intermediate value,
- (D) counting down said counting means from the start to the finish of said compensating stage wherein said intermediate value is counted down to zero,
- (E) setting said counting means at the current value of said set value,
- (F) adjusting said set value so that said object stops at said predetermined place,
- (G) continuing the process by running in a continuous loop between said steps (C) and (E).

2. A method according to claim 1 wherein said object has linear movement.

3. A method according to claim 2 wherein said object has rotary movement.

4. A method according to claim 1 wherein said operational stage has an initial lag period prior to effective braking being effected by said clutch-brake means.

* * * * *